United States Patent [19]

Kuwata et al.

[11] Patent Number: 5,034,901
[45] Date of Patent: Jul. 23, 1991

[54] INTERACTIVE GRAPHIC RECOGNITION AND DATA PROCESSING SYSTEM

[75] Inventors: Takahira Kuwata; Hatsuhiko Naitoh; Takashi Ishizaki; Satoshi Horiike, all of Hyogo; Koji Yonemoto, Osaka; Nobuhiro Nakabayashi, Hyogo, all of Japan

[73] Assignee: Mitsubishi Denki Kabushiki Kaisha, Tokyo, Japan

[21] Appl. No.: 915,061

[22] Filed: Oct. 6, 1986

[30] Foreign Application Priority Data

Oct. 7, 1985 [JP] Japan .................................. 60-221778

[51] Int. Cl.$^5$ .............................................. G06F 15/70
[52] U.S. Cl. ....................................... 364/518; 382/19; 382/30
[58] Field of Search ................. 340/710; 364/518, 521, 364/512, 557, 558, 578; 382/25, 26, 30, 39, 19, 36, 69

[56] References Cited

U.S. PATENT DOCUMENTS

| | | | |
|---|---|---|---|
| 4,041,467 | 8/1977 | Cota et al. | 364/900 |
| 4,193,119 | 3/1980 | Arase et al. | 340/710 X |
| 4,523,331 | 6/1985 | Asija | 382/30 X |
| 4,586,145 | 4/1986 | Bracewell et al. | 364/512 |
| 4,601,021 | 7/1986 | Paul et al. | 364/521 |
| 4,641,355 | 2/1987 | Hongo et al. | 382/30 X |
| 4,736,447 | 4/1988 | Korsinsky | 382/69 |

OTHER PUBLICATIONS

Pixel, "Georgraphical Information System Utilizing Graphics", No. 18, Mar. 1984.

Primary Examiner—Gary V. Harkcom
Assistant Examiner—Mark K. Zimmerman
Attorney, Agent, or Firm—Rothwell, Figg, Ernst & Kurz

[57] ABSTRACT

An interactive graphic recognition and data processing system includes an image reader for reading a facility drawing in which facility symbols are drawn, a display device for displaying the facility drawing read by the image reader overlapped with a topographical drawing corresponding thereto, a mouse for designating the position of the facility symbol displayed on the display device, a recognition device for recognizing the facility symbol designated by the mouse by comparing the same with a plurality kinds of facility symbols previously stored and causing the facility symbols recognized thereby to be displayed in different color from the color of the facility symbols which have not yet been recognized, and a memory for storing therein positional data in the topographical drawing of the facility symbol recognized by the recognition device and attributive data about the facility symbol as data base.

6 Claims, 4 Drawing Sheets

INTERACTIVE GRAPHIC RECOGNITION AND DATA PROCESSING SYSTEM

BACKGROUND OF THE INVENTION

1. Field of the Invention

The present invention relates to an interactive graphic recognition and data processing system capable of processing various graphics data by the use of computers and achieving automation and labor saving in drawing management.

2. Description of the Prior Art

With the recent rapid advancement in the computer graphics technology, such work has come to be automated as extracting one's desired data from various data described in a drawing, such as topographical data, building data, road data, river data, drainage data, transmission line-electric pole data, and processing the data by the use of a computer for managing the same as specific data. The necessity for automatic performance of such recognition and data processing of graphics is becoming larger and larger with increased complexity of urban structure and diversification of city information. Various data as described above from a complex drawing or map are classified into specific fields and desired data picked up therefrom are being utilized for city development project, building planning, and so forth.

As an example of the above described interactive graphics recognition and data processing system hitherto known is one that is described in the computer graphics magazine, "PIXEL", March, 1984.

FIG. 1 is a block diagram showing a prior art interactive graphic recognition and data processing system, wherein the graphic recognition and data processing apparatus has such components connected with a computer 6 as a graphic analyzer 1 provided with the function for inputting topographical data directly from an aerial photograph or the like, a digitizer 2 for inputting contents of a facility drawing with city facilities such as water supply and drainage, electric power, communications, or gas supply described therein, a tablet 3 for inputting, similarly to the digitizer 2, contents of the facility drawing, a CRT 4 as the graphic display device with which the operator is enabled to achieve communication with the system, and a hard copying machine 5 as an output unit. To the computer 6 are also connected a magnetic tape 7 and a magnetic disk 8 as memory media, as well as a printer 9 and a plotter 10.

Operations of the interactive graphic recognition and data processing system of the above described construction will be described below taking as an example the case where contents described in the facility drawing of FIG. 2 are input. The facility drawing of FIG. 2 is for describing waterworks such as water piping, and therein, three groups of pipes P1, P2, and P3 classified by bore, material, or the like, for example, are indicated by triple solid lines, single solid lines, and broken lines, respectively. Also, as to valves, three groups of valves V1, V2, and V3, classified by type, material, or the like are indicated by respective symbol marks. This facility drawing has been stored in a file since the waterworks were designed and executed.

In the past, the work for registering, as data base, the facility symbols for pipes P1, P2, P3, valves V1, V2, V3, manholes, and others constituting the waterworks drawn in the above described facility drawing, and the attributive data annexed to these facility symbols, bore, material, etc. of a pipe, for example, was conducted in the following manner. The operator, based on a topographical drawing made out by the graphic analyzer 1 of FIG. 1, first input positional data and attributive data of the facility symbols drawn in the facility drawing manually with the digitizer 2 or tablet 3. That is, the facility drawing was attached to the tablet 3 and the above mentioned topographical drawing was displayed on the CRT 4 as a graphic display device, and thus, the positional data and attributive data relative to the facility symbols were input with the digitizer 2 and tablet 3, with the display watched for confirmation during the inputting process. The reason why the system is called "interactive" is that the operator inputs various data and proceeds with formation of the data base through confirming the facility drawing attached to the tablet with the displayed picture on the CRT 4.

According to the prior art interactive graphic recognition and data processing system, however, there were some problems.

Firstly, since the operator input positional data and attributive data of the facility symbols through comparison of the facility drawing attached to the tablet 3 with the displayed picture on the CRT 4, and that manually, it took a vast amount of labor and time specifically when enormous volume of attributive data were to be input, and the efficiency of the work of making out a graphic data base was thereby greatly impaired.

And secondly, since manual work had to be continued for a long time, it was impossible to prevent completely the occurrence of errors in inputting operations and therefore the reliability on the completed data base was considerably lowered.

SUMMARY OF THE INVENTION

A first object of the present invention is the provision of an interactive graphic recognition and data processing system in which the graphic input operation hitherto manually performed by the operator is adapted to be mechanically and automatically performed by means of an image reader, whereby the input operation of data for facility symbols, particularly, of the attributive data, can be speeded up.

A second object of the present invention is the provision of an interactive graphic recognition and data processing system, in which the graphic input operation is automated, whereby occurrence of erroneous input operations can be prevented and the reliability on the data base can be improved.

In order to achieve the above mentioned objects, the interactive graphic recognition and data processing system according to the present invention is constituted of an image reader for reading a facility drawing, display means for displaying thereon the facility drawing read by the image reader overlapped with a topographical drawing corresponding thereto, designation means for designating the position of the facility symbol displayed on the display means, recognition means for recognizing the facility symbol designated by the designation means, picking the same out of the facility symbols previously stored and adapting the facility symbols displayed on the display means such that those already recognized and not yet recognized are displayed in different colors, and memory means for storing therein the positions in the topographical drawing of the facility symbols recognized by the recognition means and the attributes of the facility symbols as data base.

DETAILED DESCRIPTION OF THE PREFERRED EMBODIMENTS

A preferred embodiment of the interactive graphic recognition and data processing system according to the present invention will be described with reference to accompanying drawings in the following.

Figure 1:
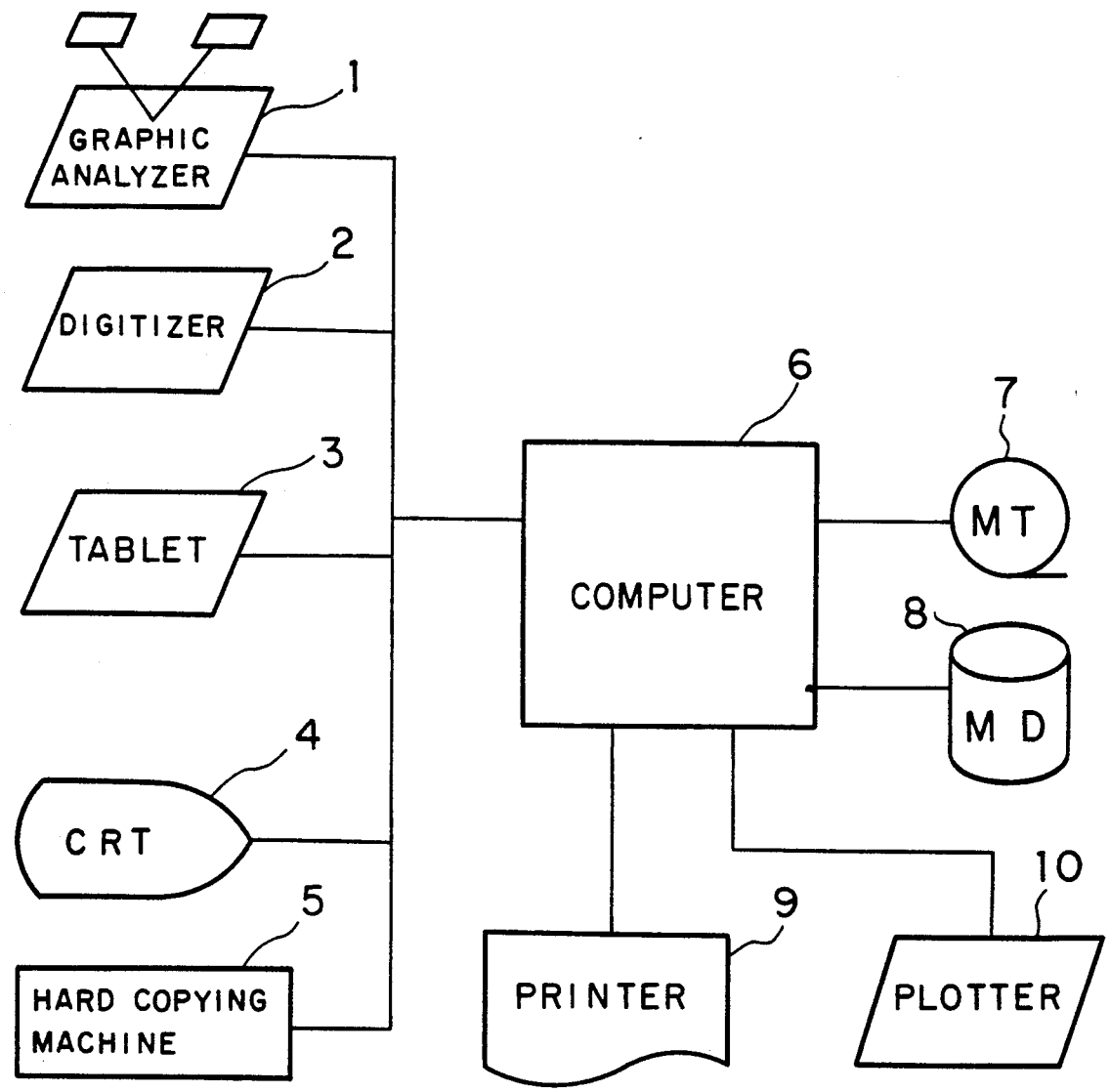
FIG. 1 is a block diagram schematically showing construction of a prior art interactive graphic recognition and data processing system.
Figure 2:
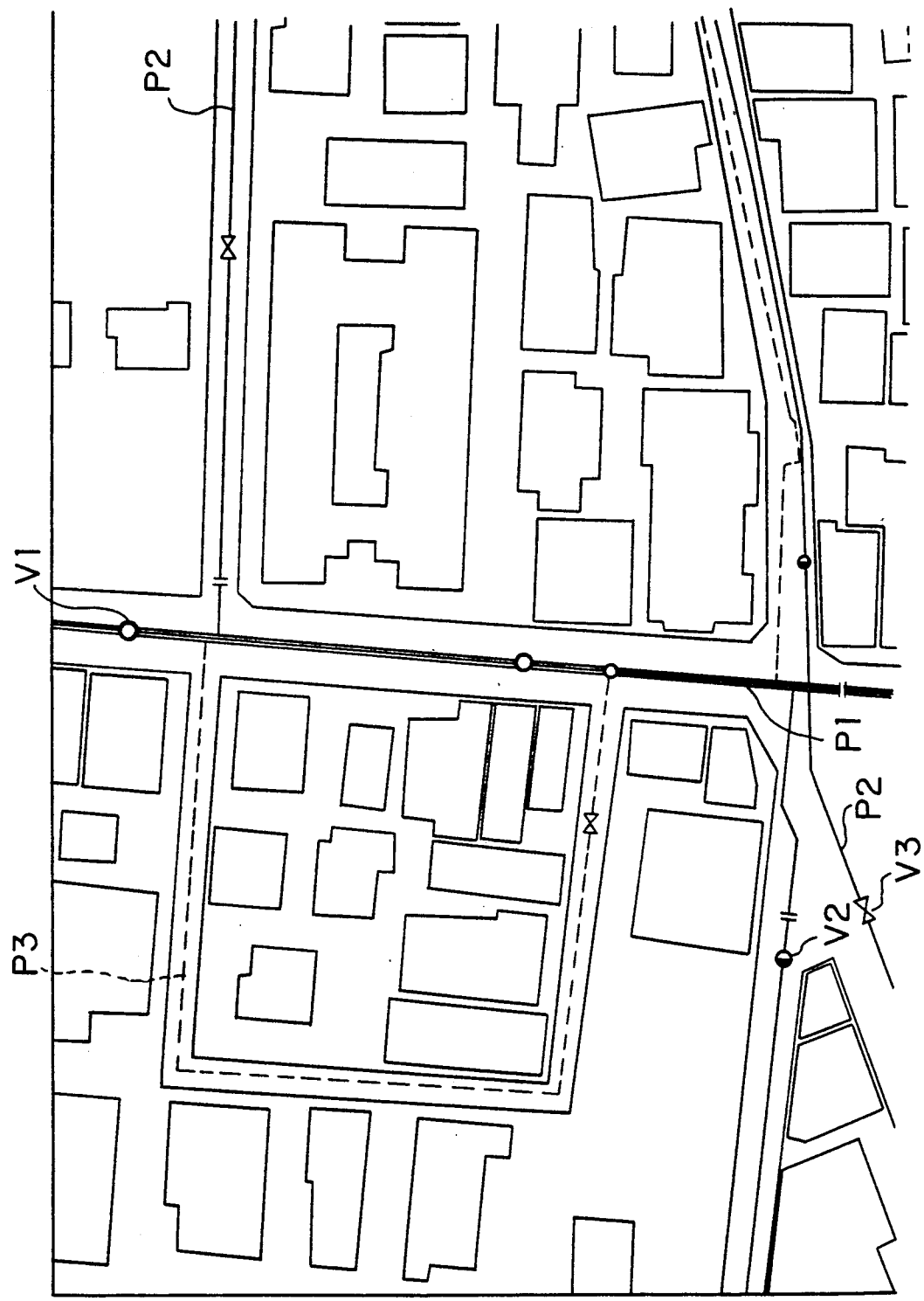
FIG. 2 is a facility drawing as an example of the object on which an interactive graphic recognition and data processing system performs recognition and data processing.
Figure 3:
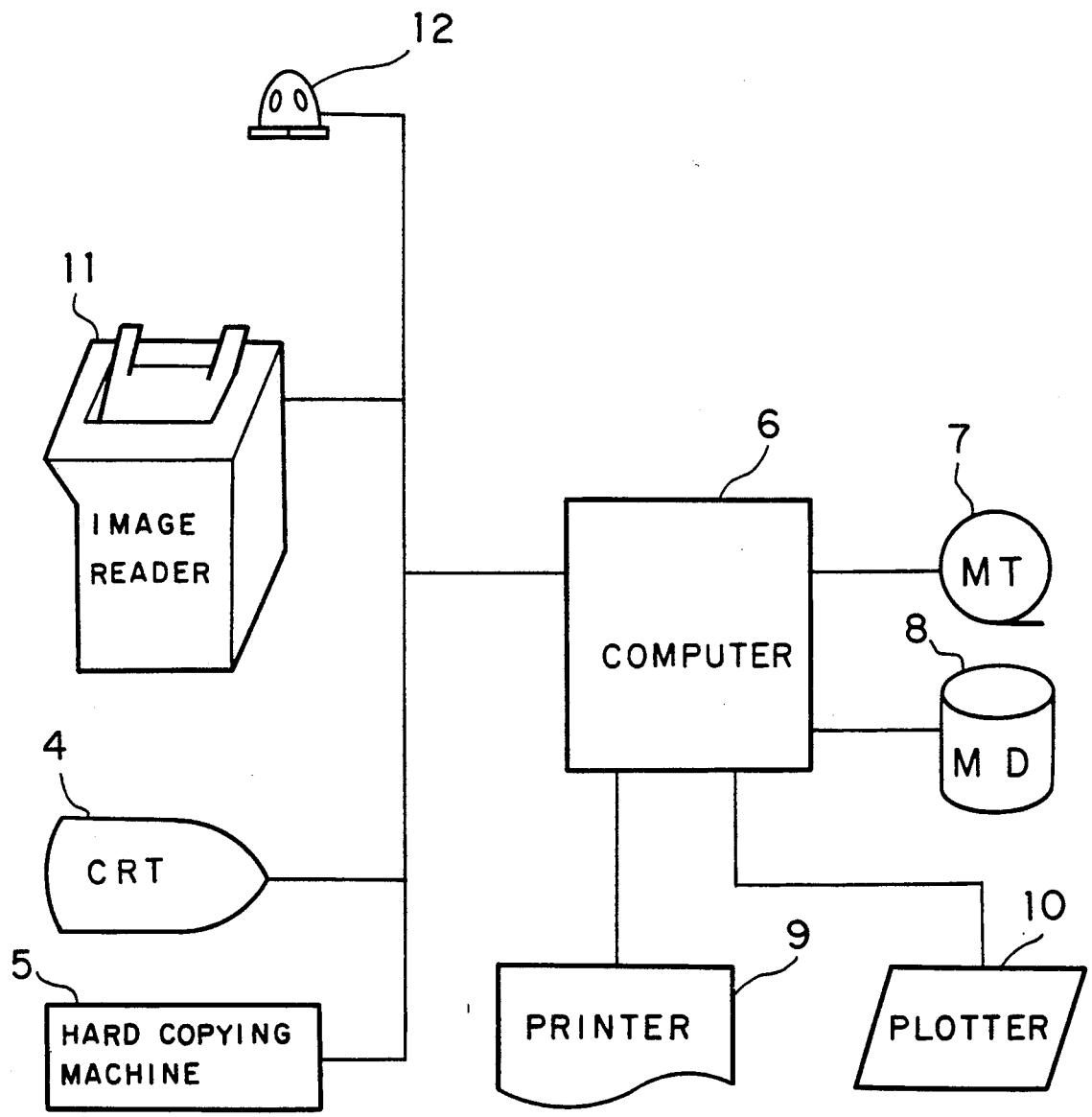
FIG. 3 is a block diagram showing an embodiment of the interactive graphic recognition and data processing system according to the present invention.

FIG. 3 is a drawing for showing fundamental construction of an embodiment of the present invention, wherein the interactive graphic recognition and data processing system has display means CRT 4 as a graphic display device and a hard copying machine 5 as an output device connected with a computer 6 as recognition means. To the computer 6 are connected components such as a magnetic tape 7 and magnetic disk 8 as memory means, a printer 9, and a plotter 10 the same as in the system of the prior art. The computer 6 is further provided with an image reader 11 for reading facility symbols such as FIG. 2, in which pipes P1-P3, valves V1-V3, etc., for example, are drawn to output two values, white and black, of image data corresponding to the facility drawing and a mouse 12 as designation means for assisting the operator when he makes interactive operation by the use of the CRT 4 as the graphic display device. The mouse 12 is an input device which is now watched by all concerned with the keenest interest and is so named because it is like a mouse in shape. It is provided with two or three switches at the portion corresponding to the eyes of the mouse. And, it is arranged such that, when these switches are pushed, instructions such as "input" and "cancel" are sent to the computer 6, and when this mouse is moved on a specific board, designation of position is made in such a manner that the position on the screen is associated with its movement.

Figure 4:
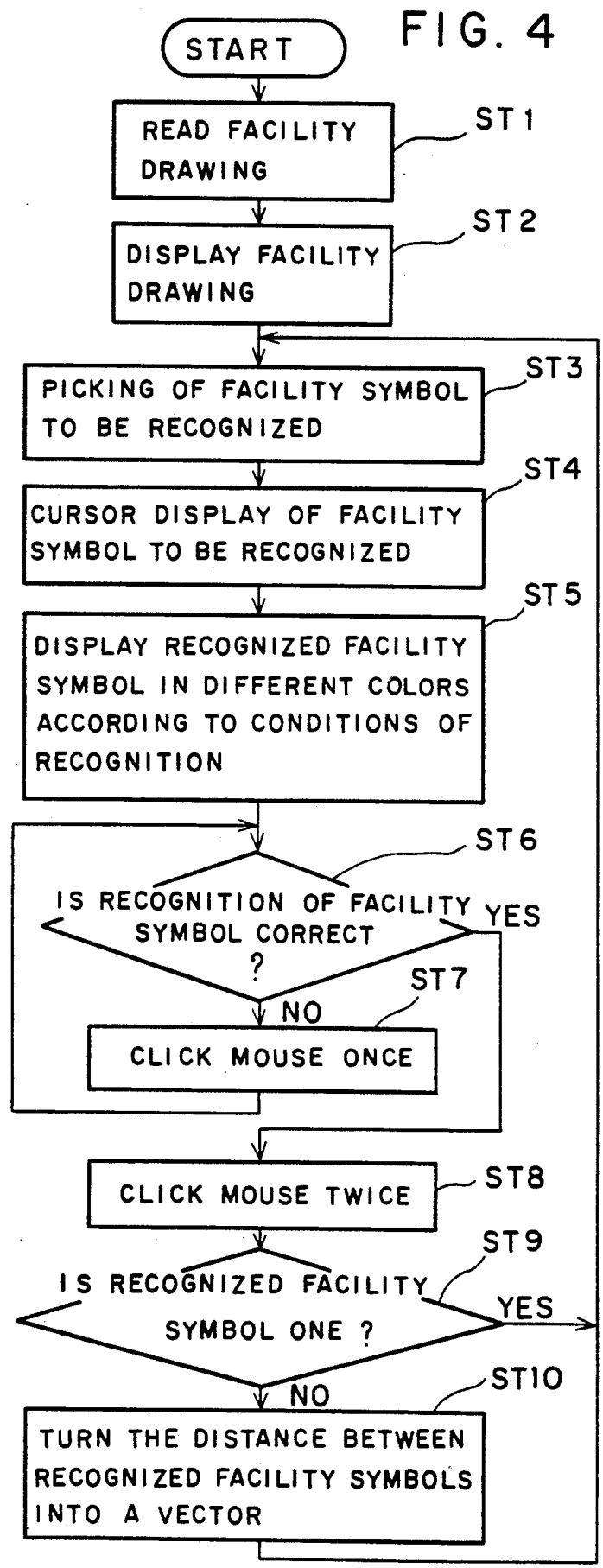
FIG. 4 is a flow chart for explaining operations of the interactive graphic recognition and data processing system according to the embodiment as shown in FIG. 3.

Operations of the interactive graphic recognition and data processing system of the above described construction will be described with reference to the flow chart of FIG. 4 and the schematic diagrams of displayed pictures of FIG. 5.

The first step (ST1)

The operator makes the image reader 11 read the facility drawing D already prepared, in which facility symbols such as pipe P2 and valves V1 and V2 are drawn. The image reader 11 reads the facility symbols drawn in the facility drawing D, for example, pipe P2, valves V1 and V2 and converts these into image data of two values (of white and black, for example).

The second step (ST 2)

Figure 5:
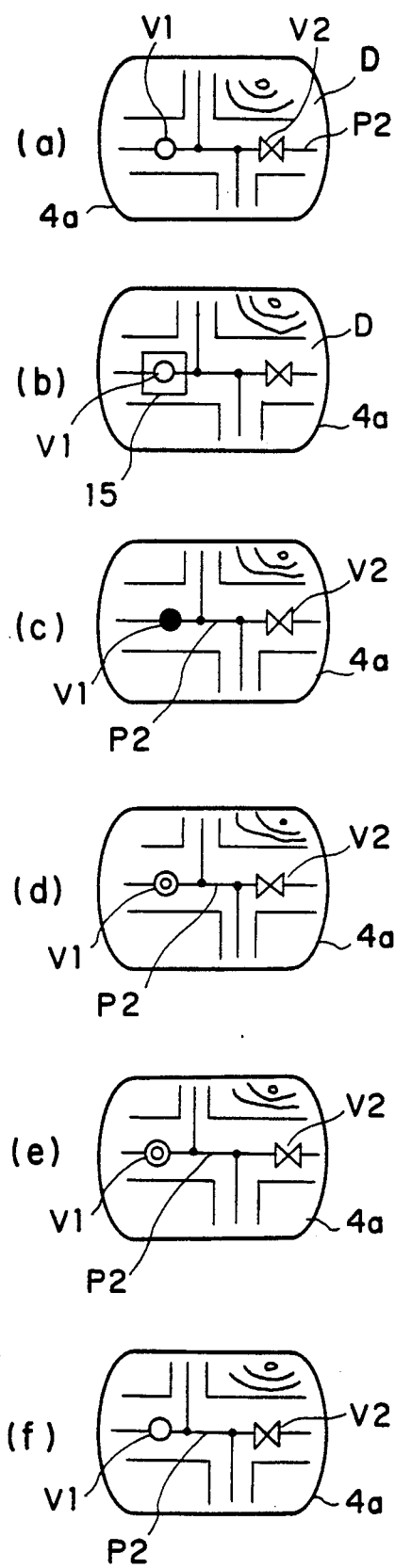
FIGS. 5(a)-(f) are schematic diagrams showing pictures on display means of the interactive graphic recognition and data processing system as shown in FIG. 3 and are arranged so as to show the changing states of the displayed image virtually in correspondence with the flow in the flow chart of FIG. 4.

The image data converted in the first step are raster-developed, and by a suitable scroll operation of the operator, the facility drawing D as shown in FIG. 5 (a) is displayed on the display screen 4a of the CRT 4 serving as the graphic display.

The third step (ST3)

The operator with the mouse 12 picks a position in the vicinity of a facility symbol to be recognized, of valve V1, for example. Then, the computer 6 issues an instruction to the CRT 4 to make a cursor display of a preset region with the picked position in center.

The fourth step (ST4)

The facility symbol to be recognized, valve V1, for example, is surrounded by a movable frame as indicated by the region 15 in FIG. 5(b) on the CRT display screen 4a. Incidentally, the computer 6 at this time gives the image data in this region, as it does when processing an ordinary picture image, such treatments as eliminating noise, thinning for removing so-called "whisker" portion from a straight line, and extracting characteristic points and such pretreatments, which were stored in the magnetic disk 8.

The fifth step (ST5)

The computer 6, by executing a program of recognition algorithm of the facility symbol, recognizes the facility symbol, valve V1, for example, within the region 15 as the object and, according to the result of the recognition, displays the recognized facility symbol of valve V1, for example, in changed display colors as shown in FIG. 5(c). That is, when the facility symbol, valve V1, has been recognized definitely, it is displayed in blue color, when it has been recognized only vaguely, it is displayed in yellow color, and when it has not been recognized at all, it is displayed in red color.

Incidentally, the recognition process of the facility symbol by the computer 6 is performed through comparison of the facility symbol to be recognized with a plurality kinds of facility symbols previously stored in the memory. At this time, if the computer 6 as the recognition means has been unable to definitely recognize the facility symbol, several kinds of facility symbols from those in the memory are arranged in the order of their probability to be stored in a table, and the one of the highest probability as the facility symbol to be recognized is displayed for the purpose that the operator determines the probability on the basis of general knowledge.

The sixth step (ST6)

The operator judges whether the result of the recognition process of the facility symbol performed by the computer 6 was correct or not.

The seventh step (ST7)

If the above mentioned result of the recognition process is judged by the operator to be incorrect, the mouse is clicked once; each time the mouse is clicked once, the facility symbols are displayed one by one in the order of probability as shown in FIGS. 5(d), (e), and (f).

The eighth step (ST8)

When the facility symbol displayed on the CRT display screen 4a is judged correct, the mouse 12 is clicked twice.

Now, since the computer 6 displays the facility symbols stored in the table one after another in the order of the probability every time the mouse 12 is clicked once in ST7 or ST8, the operator is only required to continue clicking the mouse once until the right facility symbol appears on the display. If the mouse is clicked twice, the computer 6 understands that the facility symbol to be recognized has been finally confirmed and makes the positional data of the recognized facility symbol in the facility drawing and the attributive data of the facility symbol stored in the magnetic disk 8 as data base.

The ninth step (ST9)

The computer 6 judges whether one facility symbol is recognized or not, and if the computer 6 judges one facility symbol to be recognized, it is understood thereby that the recognition of the facility symbol has been finished without leaving any problem, and the execution of the program is returned to ST 3. The recognition of the facility symbol has thus been executed.

The tenth step (ST10)

When the computer 6 judges a plurality of the facility symbols which are recognized, pipe P2 between the recognized facility symbols is turned into, and displayed as, a vector and makes this pipe P2 also stored in the magnetic disk 8 as a unit of relational data, and the execution is returned to ST3.

The recognition of various facility symbols in the facility drawing is proceeded with in the described manner and reading and recognition of all the valves and pipes are performed.

Although, in the above described embodiment, the interactive graphic recognition and data processing system making the water supply facility as its object was illustrated, the present invention is not limited thereto but can be applied to the interactive graphic recognition and data processing system for such object as power transmission and distribution facility, gas piping facility, and so on, to provide similar effects to those obtained in the above described embodiment.

As described in detail in the foregoing, the interactive graphic recognition and data processing system according to the present invention provides the following effects.

Firstly, since a facility drawing in which facility symbols read by the image reader are drawn is displayed overlapped with the corresponding topographical drawing by display means, the displayed facility symbol is designated by designation means, the designated facility symbol is recognized through comparison thereof with facility symbols stored in advance, the display color of the recognized facility symbol is changed by means of the recognition means, and the attributive data thereof is made to be stored in memory means, the recognizing operation to input positional data and attributive data of the facility symbols as data base is expedited, and therefore, a speed-up in the data processing work and reduction in the work load on the operator can be achieved.

Further, by realization of automation and mechanization of the data processing work as described above, erroneous input operations as were produced when the work was made by manual operation can be prevented, and therefore, the reliability on the data base can be improved.

What is claimed is:

1. An interactive graphic recognition and data processing system comprising:
    read means for reading a facility drawing containing facility symbols;
    display means for displaying said facility drawing read by said read means as a topographical drawing corresponding to said facility drawing;
    designation means for designating a facility symbol displayed on said display means;
    recognition means for recognizing said designated facility symbol by comparing said designated facility symbol with a plurality of facility symbols previously stored and coloring said designated facility symbol which has gone through a recognition process with a specified color based on the degree of recognition achieved by said recognition process;
    confirmation means for enabling an operator to confirm the correctness of the recognition of said designated facility symbol; and
    memory means for storing therein positional data of said designated facility symbol on said topographical drawing as confirmed by said confirmation means and attributive data about said facility symbol as a data base.

2. An interactive graphic recognition and data processing system according to claim 1, wherein said read means is constituted of an image reader.

3. An interactive graphic recognition and data processing system according to claim 1, wherein said display means is constituted of a graphic display device.

4. An interactive graphic recognition and data processing system according to claim 1, wherein said designation means is constituted of a mouse capable, by moving the same on a specific board, of designating the position of said facility symbol on the display screen of said display means in correspondence with the board, said designation means having a form similar to a mouse in profile.

5. An interactive graphic recognition and data processing system according to claim 1, wherein said recognition means is constituted of a computer.

6. An interactive graphic recognition and data processing system according to claim 1, wherein said recognition means comprises a computer and said memory means comprises a magnetic disk and a magnetic tape annexed to said computer.

* * * * *